(12) United States Patent
Blades

(10) Patent No.: US 11,346,446 B2
(45) Date of Patent: May 31, 2022

(54) SEAL

(71) Applicant: AIRBUS OPERATIONS LIMITED, Bristol (GB)

(72) Inventor: Paul Blades, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 121 days.

(21) Appl. No.: 16/588,559

(22) Filed: Sep. 30, 2019

(65) Prior Publication Data
US 2020/0049253 A1 Feb. 13, 2020

Related U.S. Application Data

(63) Continuation of application No. 15/379,465, filed on Dec. 14, 2016, now Pat. No. 10,480,653.

(30) Foreign Application Priority Data

Dec. 15, 2015 (GB) ..................... 1522061

(51) Int. Cl.
| B64C 9/02 | (2006.01) |
| F16J 15/02 | (2006.01) |
| B64C 9/14 | (2006.01) |
| B64C 7/00 | (2006.01) |
| B64C 9/16 | (2006.01) |
| B64C 9/18 | (2006.01) |

(52) U.S. Cl.
CPC .............. *F16J 15/021* (2013.01); *B64C 7/00* (2013.01); *B64C 9/02* (2013.01); *B64C 9/14* (2013.01); *B64C 9/16* (2013.01); *B64C 9/18* (2013.01)

(58) Field of Classification Search
CPC .... B64C 9/02; B64C 9/14; B64C 9/16; B64C 9/18
See application file for complete search history.

(56) References Cited

U.S. PATENT DOCUMENTS

| 2,289,704 | A | 7/1942 | Grant |
| 3,478,987 | A | 11/1969 | Dorand |
| 4,120,470 | A | 10/1978 | Whitener |
| 4,823,836 | A | 4/1989 | Bachmann et al. |
| 5,222,692 | A | 6/1993 | Glowacki |
| 6,401,398 | B1* | 6/2002 | Panayides ................. B64C 1/14 |
| | | | 49/498.1 |
| 7,051,982 | B1 | 5/2006 | Johnson |
| 7,611,099 | B2 | 11/2009 | Kordel et al. |
| 8,342,452 | B2* | 1/2013 | Candela .................... B64C 7/00 |
| | | | 244/130 |
| 8,360,438 | B2 | 1/2013 | Wildman et al. |
| 8,556,214 | B2 | 10/2013 | McAlinden et al. |
| 8,919,703 | B2 | 12/2014 | Parker |
| 9,688,384 | B1 | 6/2017 | Balzer et al. |

(Continued)

FOREIGN PATENT DOCUMENTS

| EP | 2266877 | 12/2010 |
| WO | 2010/023475 | 3/2010 |

OTHER PUBLICATIONS

UKIPO Search Report dated May 27, 2016 issued in Great Britain Application No. 1522061.9.

*Primary Examiner* — Justin M Benedik
(74) *Attorney, Agent, or Firm* — Nixon & Vanderhye P.C.

(57) ABSTRACT

A seal is disclosed for a wing for providing an aerodynamic seal between a fixed aerofoil and a movable control surface.

17 Claims, 4 Drawing Sheets

(56) References Cited

U.S. PATENT DOCUMENTS

| | | | |
|---|---|---|---|
| 10,480,653 B2 * | 11/2019 | Blades | B64C 9/16 |
| 2006/0249627 A1 | 11/2006 | Martin Hernandez | |
| 2007/0252040 A1 | 11/2007 | Kordel et al. | |
| 2010/0288887 A1 | 11/2010 | Parker | |
| 2010/0327121 A1 | 12/2010 | McAlinden et al. | |
| 2011/0031349 A1 * | 2/2011 | Wildman | B64C 9/323 244/123.1 |
| 2011/0133411 A1 | 6/2011 | Wildman et al. | |

\* cited by examiner

SEAL

CROSS RELATED APPLICATIONS

This application is a Continuation of U.S. patent application Ser. No. 15/379,465, filed Dec. 14, 2016, now pending, which claims priority from Great Britain Patent Application No. 1522061.9, filed Dec. 15, 2015, the entire contents of each of which are hereby incorporated by reference.

FIELD OF TECHNOLOGY

The present technology relates to seals. Such seals may be used for providing an aerodynamic seal between a fixed aerofoil and a movable control surface.

BACKGROUND

Seals are generally arranged to provide sealing between two or more parts of a structure. One or more of the parts may be movable relative to the other parts and a seal arranged to provide a degree of sealing between the parts for at least part of that movement. Aircraft comprise aerofoils, which generally comprise fixed aerofoil structures and a set of one or more control surfaces that are moveable relative to the fixed aerofoil. The control surfaces are arranged to be moveable so as to modify the aerodynamic qualities of the aerofoil and thus enable control of the aircraft in flight. For at least some control surfaces, their function is improved if a seal is maintained between the control surface and the fixed aerofoil for at least a predetermined part of the movement relative to the aerofoil. Such seals enable continuity of airflow over the interface between the fixed aerofoil and the control surface. Seals may also prevent leakage of air between the aerofoil and the control surface, which may otherwise have a detrimental effect on the function of the aerofoil or the control surface.

BRIEF SUMMARY OF THE TECHNOLOGY

An embodiment of the present technology provides a seal for use in a wing comprising a fixed aerofoil, a resilient seal plate fixed to the aerofoil, a control surface moveable relative to the aerofoil and a seal arranged to seal between the seal plate and the control surface, the seal comprising: a first seal portion configured to provide a seal between a free edge of the seal plate and an edge of the control surface and further configured to transmit a first bending moment from the control surface to the seal plate in a first position of the control surface relative to the aerofoil; and a second seal portion configured to provide a seal between the free edge of the seal plate and the edge of the control surface and further configured to transmit a second bending moment from the control surface to the seal plate in a second position of the control surface relative to the aerofoil, wherein the first and second seal portions are relatively configured such that the second bending moment is substantially greater than the first bending moment.

The first and second seal portions may be arranged such that the first and second bending moments provide sealing engagement between the seal plate and the edge of the control surface. The second seal portion may be arranged such that the second bending moment maintains the free edge of the seal plate towards the edge of the control surface when the control surface is in the second position. The second seal portion may be arranged such that the second bending moment bends the seal plate so as to substantially aerodynamically conform to the control surface.

The seal may be arranged to be positioned between the trailing edge of the seal plate and the leading edge of the control surface. The first seal portion may be arranged to substantially conform to the abutting portion of the edge of the control surface and the second seal portion provides a cam arranged to capture the edge of the control surface and bend the seal plate in the direction of the second position of the control surface.

The seal may comprise a transition portion between the first and second seal portions arranged to sealingly engage with the edge of the control surface between the first and second positions of the control surface. The transition portion may be concave with respect to the edge of the control surface. The second portion may comprise a first and second regions spaced spanwise, the first region being formed so as to impart a greater bending moment on the seal plate than the second region. The first and second regions may each impart their respective bending moments on the same seal plate.

A wing comprising a seal according to embodiments of the present technology. The edge of the control surface abutting the seal may comprise a follower member arranged to conform to the seal in at least the first position of the control surface. The follower member may be integrally formed with at least part of the control surface. The seal may be integrally formed with the seal plate. The control surface may be a spoiler. The control surface may be a droopable spoiler and the first position represents a cruise configuration for the wing and the second position represents high lift configuration for the wing.

Another embodiment of the present technology provides a seal substantially as described herein with reference to FIG. 2 or FIG. 4.

A further embodiment provides a wing substantially as described herein with reference to the accompanying drawings.

BRIEF DESCRIPTION OF THE DRAWINGS

Embodiments of the technology will now be described, by way of example only, with reference to the following drawings in which.

DETAILED DESCRIPTION OF EMBODIMENTS OF THE TECHNOLOGY

Figure 1:
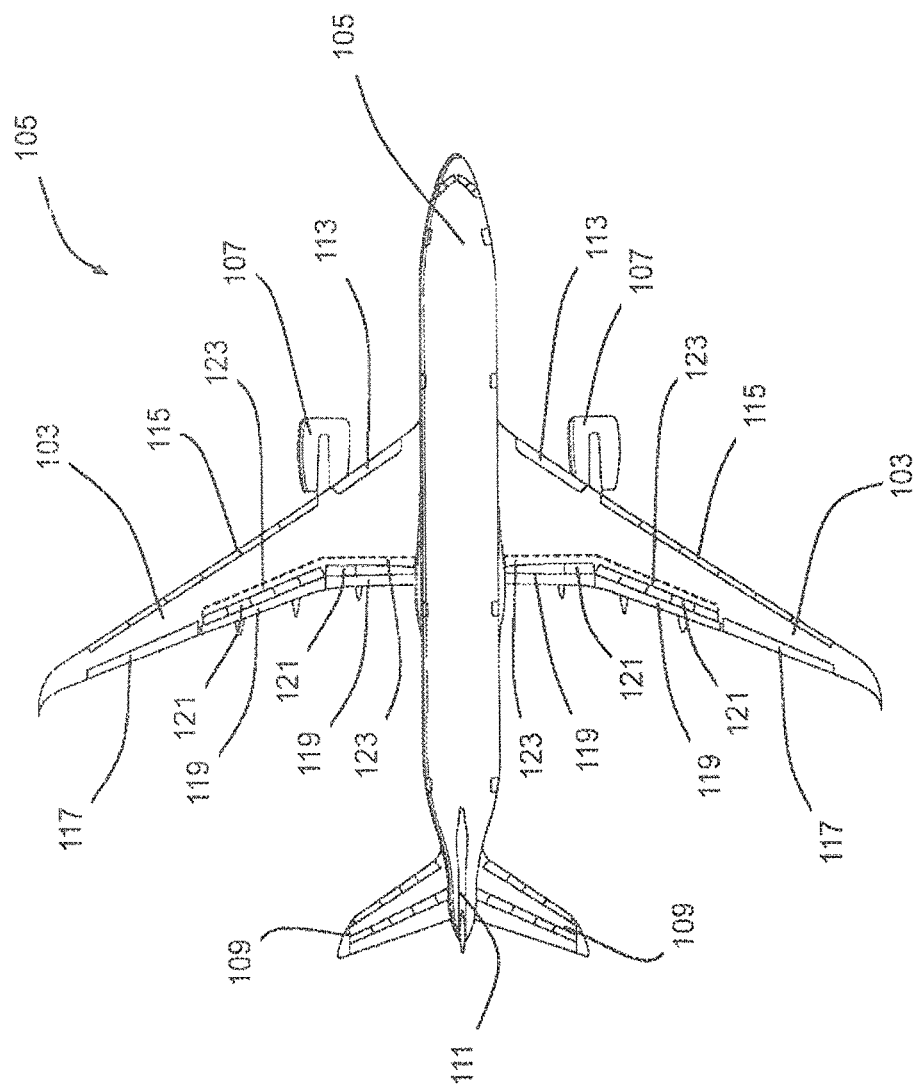
FIG. 1 is a plan view of an aircraft.

With reference to FIG. 1, an aircraft 101 comprises a pair of fixed aerofoils in the form of wings 103 faired into a fuselage 105. The wings 103 each carry an engine 107. The aircraft further comprises horizontal stabilizers 109 and a vertical tail plane 111 each attached at the rear of the fuselage 105. Each of the wings 103 are provided with a set of control surfaces 113, 115, 117, 119, 121 in the form of droop leading edges 113, leading edge slats 115, ailerons 117, inner and outer flaps 119 and spoilers 121. In the present embodiment, the trailing edge of each wing 103 in the spanwise region 121 adjacent the spoilers 121 is comprised by a set of seal plates 123 that are arranged to be resiliently movable upwardly and downwardly with reference to the main plane of the wing 103 as described in further detail below.

Figure 2:
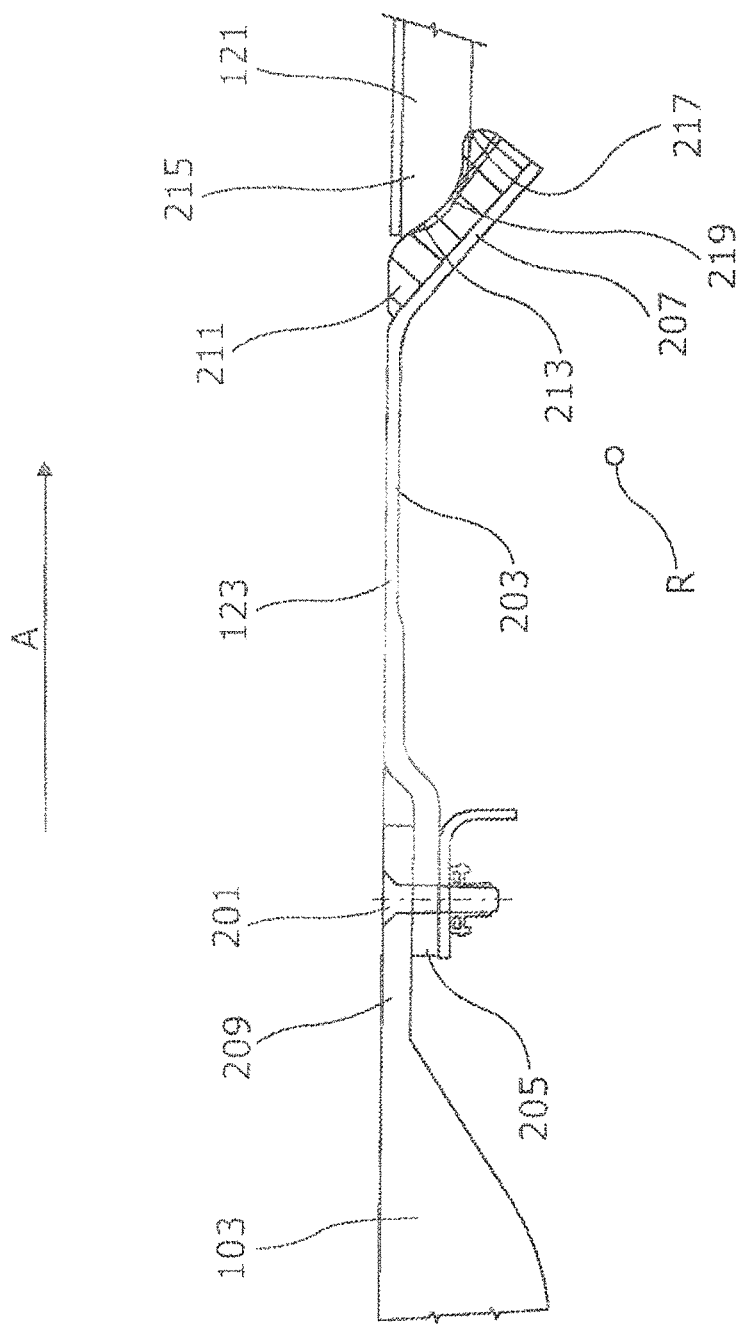
FIG. 2 is a cross sectional view of a seal in a first configuration in the aircraft of FIG. 1.

With reference to FIG. 2, in one embodiment, each seal plate 123 comprises a body 203 having a leading edge 205 and a trailing edge 207 with respect to the direction of the airflow A over the wing 103. The leading edge 205 is in the form of a flange that is fixed, for example by bolt assemblies 201, to a corresponding flange 209 of the adjacent structure of the wing 103. The fixing of the seal plate 123 to the wing 103 is arranged such that the surface of the seal plate 123 exposed to the airflow A substantially conforms to the aerodynamic profile of the wing 103. The seal plate 123 is flexible so that its trailing edge 207 is moveable upwardly or downwardly with respect to the upper surface of the wing 103. The seal plate 123 is resiliently biased into a rest position, which is substantially as shown in FIG. 2. The trailing edge 207 of the seal plate 123 is comprised by a flange that is acutely angled downward relative to the upper surface of the wing 103 so that its uppermost face is aft facing. In the present embodiment, the seal plate 123 is formed from glass reinforced plastic.

A seal 211 is fixed to the aft facing surface of the trailing edge 207. In the present embodiment, the seal 211 is bonded to the trailing edge 207. In the present embodiment, the seal 211 is unitary for a given seal plate 123 and formed from resiliently deformable material. The aft facing surface of the seal 211 comprises a first seal portion 213 formed so as to substantially sealingly engage with the leading edge 215 of the spoiler 121 in its non-deployed and non-dropped configuration as shown in FIG. 2. Generally, the non-deployed and non-dropped configuration of a spoiler is the configuration adopted for cruise conditions of the aircraft 101. The seal further comprises a second seal portion 217 in the form of a cam arranged, in the cruise configuration shown in FIG. 2, to be substantially functionally disengaged from the leading edge 215 of the spoiler 121. The seal 211 further comprises a transition portion 219 comprised by the aft facing region of the seal between the first and second portions 213, 217. In the present embodiment, the transition portion 219 is profiled to conform to the leading 215 of the spoiler 121 so as to provide a further sealing surface in addition to the first portion 213. In the present embodiment, the transition portion 219 is concave.

In the configuration of FIG. 2, the spoiler 121 is set up or rigged so that its leading edge 215 engages with the first seal portion 213. The engagement of the spoiler 121 and the seal 211 is arranged to induce a predetermined bending moment in the sealing plate 123. The resilience of the sealing plate correspondingly biases the seal 211 against the leading edge 215 of the spoiler so as to form an aerodynamic seal between the leading edge 215 and the trailing edge 207 of the seal plate 123. In the configuration of FIG. 2, the downward bending or deflection of the seal plate 123 resulting from the induced bending moment is configured to be minimal while still enabling the resilience of the seal plate 123 to provide sufficient sealing force. Minimal deflection of the seal plate 123 in the present configuration may reduce wear in the seal 211 and reduces the upward deflection of the seal plate 123 when the spoiler 121 is deployed upwardly, free of the seal plate 123.

Figure 3:
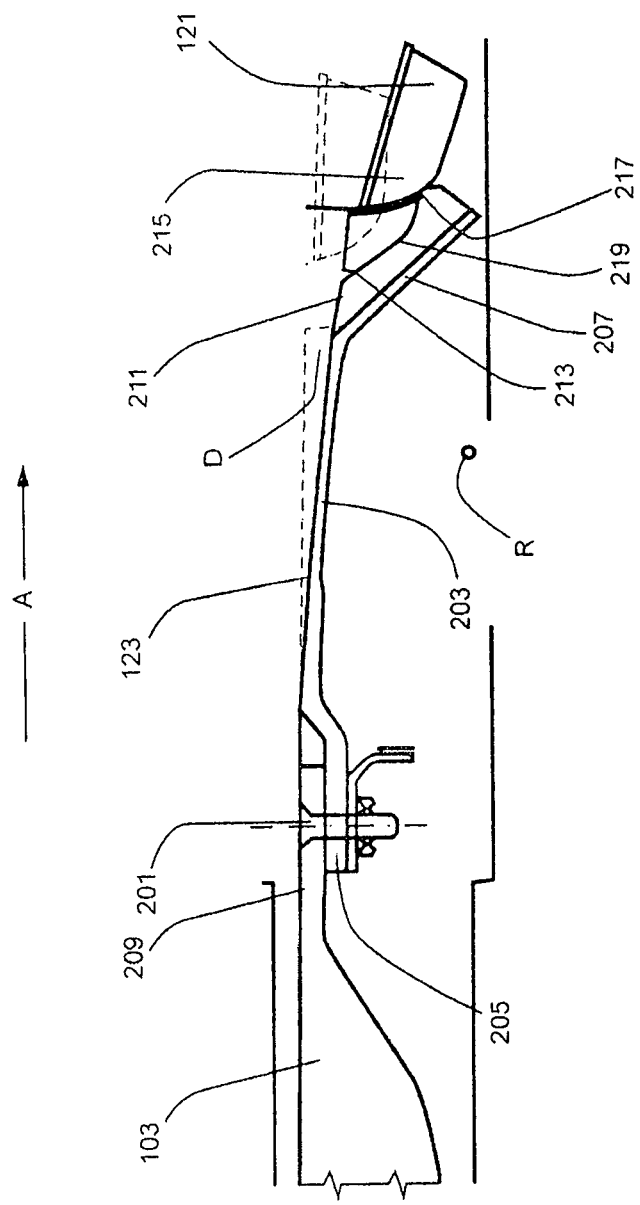
FIG. 3 is a further cross sectional view of the seal of FIG. 2 in second configuration.

With reference to FIG. 3, when the spoiler 121 is drooped it rotates downwardly away from the upper surface of the wing 103 about an axis R. As a result, the leading edge 215 of the spoiler slides over the surface of the seal 211 away from its position engaged with the first portion of 213, over the transition portion 219 to engage with the cam of the second portion 217 of the seal 211 as shown in FIG. 3. The second portion 217 of the seal 211 is arranged to catch the leading edge 215 of the spoiler 121 so that the drooping of the spoiler 121 imparts a predetermined second bending moment on the seal plate 123. This second bending moment results in the trailing edge 207 of the seal plate 123 being pulled downwardly towards the spoiler 121, by a predetermined distance D, thereby bending the seal plate 123 so that its aerodynamic upper surface conforms to a predetermined aerodynamic profile. In the present embodiment, the bending moment induced in the seal plate 123 is arranged to conform the seal plate 123 to an optimal aerodynamic profile with respect to the spoiler 121 in its drooped position and the corresponding flap 119 in a high-lift configuration.

In the deployment movement of the spoiler 121 from its non-deployed position of FIG. 2 to its drooped position of FIG. 3, the leading edge 215 of the spoiler 121 is arranged to follow the aft facing surface of the seal 211. The resilience of the seal plate 123 is arranged to bias the seal 211 into engagement with the leading edge 215 so as to maintain the seal between them for substantially the whole movement to the deployed position of FIG. 3.

As noted above, in the non-deployed position of FIG. 2 to its drooped position of FIG. 3 the spoiler 121 imparts a first bending moment on the seal plate 123 and in the deployed position of FIG. 3 the spoiler 121 imparts a second bending moment on the seal plate 123. In the intermediate positions of the spoiler 121 between these two states, the leading edge 215 of the spoiler 121 slides from the first portion 213 of the seal over the intermediate portion 219 to the second portion 217. The profile of the seal surfaces 213, 217, 219 are arranged in the present embodiment, taking into account the center of rotation R of the spoiler 121, to cause a substantially linear increase in the bending moments applied to the seal plate 123 as the spoiler 121 moves from the stowed to drooped position. The linear increase in the bending movement is arranged to translate to a corresponding linear change in curvature of the seal plate 123 during the deployment of the spoiler 121.

In the present embodiment, the seal 211 is formed from a material that is sufficiently compliant to enable a suitable seal to be formed as described above while resisting substantial deformation of the seal that would be detrimental to the efficient transmissions of the bending moment to the seal plate 123. In the present embodiment the seal is formed from a silicone rubber. In other embodiments the seal may be formed from polyurethane.

Further embodiments of the technology are described below with reference to respective figures in which, for clarity, the same nomenclature is used between figures for elements that are common between embodiments.

Figure 4:
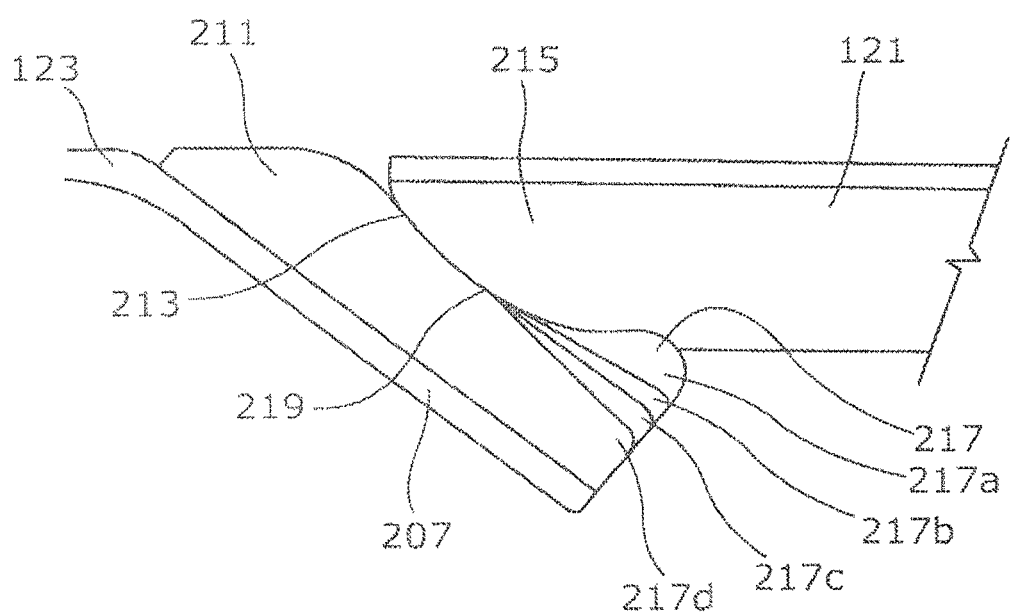
FIG. 4 is a cross sectional view of a seal in accordance with another embodiment of the technology.

In a further embodiment of the technology, with reference to FIG. 4, the profile of the seal 211 varies in a span-wise direction along the seal 211. FIG. 4 illustrates four differing profiles 217a, 217b, 217c, 217d of the second seal portion 217, each distributed span-wise in the seal 211 and thus shown in dotted lines. In each of the seal profiles 217a, 217b, 217c, 217d, the shape of the cam is varied span-wise. The variance in the profile of the seal 211 is arranged to provide different bending moments in span-wise spaced portions of the seal plate 123 and corresponding variances in the curvature of the seal plate 123 for one or more given rotational positions of the spoiler 121. In this manner, the curvature of the seal plate 123 is arranged to substantially conform both chord-wise and span-wise to a predetermined aerodynamic profile. In effect, the profile of the seal 211 is arranged to tune the aerodynamic surface of the seal plate 123 for a range of positions of the spoiler 121. As noted above, the wings 103 comprise a set of span-wise distributed seal plates 123. In the present embodiment, the respective profiles of the seals 211 at the edge regions of adjacent seal plates 123 are arranged such that the respective curvature of adjacent seal plates 123 in their adjacent regions is suitably matched.

In another embodiment, the profile of the seal is arranged so that the bending moment applied to the seal plate during the deployment movement of the spoiler from the stowed to drooped configuration varies non-linearly at a given spanwise region with respect to the movement of the spoiler.

In a further embodiment, the spanwise profile of the seal is arranged so that the variance of the bending moment applied to the seal plate during the deployment movement of the spoiler from the stowed to drooped configuration differs between respective spanwise regions associated with a given set of spoilers. In other words, the change in curvature during droop spoiler deployment of a set of one or more seal plates may be arranged to vary spanwise and/or chordwise for a given seal plate or between a plurality of seal plates.

In another embodiment, the movement of the movable control surface with respect to the fixed aerofoil comprises one or more translations. In a further embodiment, the movement of the movable control surface with respect to the fixed aerofoil comprises one or more translations and one or more rotations. In either or the above embodiments, the seal interface is arranged such that the predetermined bending moment is applied to the flexible plate so as to provide the required curvature of the associated aerodynamic surface.

Embodiments of the technology are not limited to any particular movable control surface leading edge profile. The associated seal surface may be profiled to fully or partially conform to the leading edge in any relevant position of the moveable. As will be understood by those skilled in the art, the control surface or flexible plate may be provided with an integral or discrete seal follower.

In a further embodiment, the profiled seal may be provided on movable control surface edge with the follower being provided on trailing edge of seal/bridging plate. In another embodiment, the functions of the profile and seal are split between the fixed plate and movable control surface so that the plate carries the relevant profile and the movable control surface carries the seal or visa versa.

In another embodiment of the technology, the interfacing surfaces, in the form of the glass fibre seal plate and the painted carbon fibre spoiler leading edge, can also be profiled to form the same function if an intermediate compliant sealing member as described above. In other words a separate seal may not be required or only a minimal seal or suitable sliding surface coating may be provided.

Embodiments of the technology are arranged to improve the high lift performance of the wing by effectively sealing the spoiler to upper panel junction preventing the cross flow of high pressure air from the lower wing surface to the low pressure zone on the wing top surface. Embodiments of the technology are arranged to improve the high lift performance of the wing by inducing a sympathetic downward deflection of the bridging plate when the spoilers are deflected downwards.

Embodiments of the technology are arranged to ensure that the bridging plate to spoiler leading edge interface is fully sealed over the variable camber range, the cruise position and down to a fully drooped spoiler in all of the high lift configurations whilst positively deforming the seal plate in the drooped spoiler configurations to provide the an improved aerodynamic profile.

As will be understood by those skilled in the art, the term seal plate is not intended to be limiting and includes other terms such as bridging plate used to refer to a plate providing a flexible trailing edge functionality to the aerofoil as described above formed as an integral or discrete part. As will be understood by those skilled in the art, the seal plate may be integrally formed or fixed to the wing by any suitable means.

As will be understood by those skilled in the art, the seal may be integrally formed with seal or bridging plate.

As will be understood by those skilled in the art, the technology described herein is not limited to use with spoilers but can be applied to any structure comprising a fixed and movable parts.

The embodiments described herein are respective non-limiting examples of how the present technology, and aspects of the present technology, may be implemented. Any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined by the accompanying claims.

The invention claimed is:

1. An apparatus comprising a seal for an aircraft, the aircraft comprising a fixed component, a resilient seal plate fixed to the fixed component, a moveable component moveable relative to the fixed component, and the seal arranged to seal between the seal plate and the movable component, the seal further comprising:
   a first seal portion sealing between a free edge of the seal plate and an edge of the movable component and further configured to transmit a first bending moment from the movable component to the seal plate in a first position of the movable component relative to the fixed component;
   a second seal portion sealing between the free edge of the seal plate and the edge of the movable component and further configured to transmit a second bending moment from the movable component to the seal plate in a second position of the movable component relative to the fixed component;
   wherein the seal further comprises an intermediate portion disposed between the first and second seal portions in facing relation to and sealingly engage, the leading edge of the movable component between the first and second positions of the movable component;
   wherein the first and second seal portions are protruding outwardly and bounding an inwardly curved portion of the intermediate portion; and,
   wherein the first and second seal portions are relatively configured such that the second bending moment is substantially greater than the first bending moment.

2. The apparatus according to claim 1 in which the first and second seal portions are arranged such that the first and second bending moments provide sealing engagement between the seal plate and the edge of the movable component.

3. The apparatus according to claim 1 in which the second seal portion is arranged such that the second bending moment maintains the free edge of the seal plate towards the edge of the movable component when the movable component is in the second position.

4. The apparatus according to claim 1 in which the second seal portion is arranged such that the second bending moment bends the seal plate so as to substantially aerodynamically conform to the movable component.

5. The apparatus according to claim 1 arranged to be positioned between the trailing edge of the seal plate and the leading edge of the movable component.

6. The apparatus according to claim 1 in which the first seal portion is arranged to substantially conform to the abutting portion of the edge of the movable component and the second seal portion provides a cam arranged to capture the edge of the movable component and bend the seal plate in the direction of the second position of the movable component.

7. The apparatus according to claim 1, in which the intermediate portion is concave with respect to the edge of the movable component.

8. The apparatus according to claim 1 in which the second portion comprises a first and second regions spaced spanwise, the first region being formed so as to impart a greater bending moment on the seal plate than the second region.

9. The apparatus according to claim 8 in which the first and second regions are configured to impart their respective bending moments on the same seal plate.

10. A wing comprising a seal according to claim 1.

11. A wing according to claim 10 in which the edge of the movable component abutting the seal comprises a follower member arranged to conform to the seal in at least the first position of the movable component.

12. A wing according to claim 11 in which the follower member is integrally formed with at least part of the movable component.

13. A wing according to claim 10 in which the seal is integrally formed with the seal plate.

14. A wing according to claim 10 in which the movable component is a spoiler.

15. A wing according to claim 10 in which the movable component is a droopable spoiler and the first position represents a cruise configuration for the wing and the second position represents high lift configuration for the wing.

16. A seal according to claim 1, wherein the fixed component is a fixed aerofoil.

17. A seal according to claim 1, wherein the movable component is a control surface.

* * * * *